United States Patent
Mahn et al.

(10) Patent No.: US 10,428,225 B1
(45) Date of Patent: *Oct. 1, 2019

(54) LOW REFLECTANCE POWDER COATING COMPOSITION

(71) Applicant: SWIMC LLC, Cleveland, OH (US)

(72) Inventors: Edmund J. Mahn, Grove City, OH (US); Mark E. Walker, Tinley Park, IL (US); Mark J. Wytiaz, Chicago, IL (US)

(73) Assignee: SWIMC LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/798,329

(22) Filed: Mar. 13, 2013

(51) Int. Cl.
*C09D 5/03* (2006.01)

(52) U.S. Cl.
CPC .................................. *C09D 5/035* (2013.01)

(58) Field of Classification Search
None
See application file for complete search history.

(56) References Cited

U.S. PATENT DOCUMENTS

| 5,631,330 | A | * | 5/1997 | Yezrielev | C08G 63/06 525/418 |
| 2004/0235984 | A1 | * | 11/2004 | Nicholl et al. | 523/200 |
| 2005/0065294 | A1 | * | 3/2005 | Cramer | H01B 7/295 525/476 |

FOREIGN PATENT DOCUMENTS

EP     1 162 241 A2 * 12/2001

OTHER PUBLICATIONS

PCI Paint and Coatings Industry, Wollastonite A Versatile Functional Filler, Nov. 2002, p. 1-7.*
Giles et al., *Novel Methods of Producing Low-Reflectance Coatings Utilizing Synergistic Effects of Polymer Phase Separation*, ACS Appl. Mater. Interfaces, 2016, 8, 26251-26257.

* cited by examiner

*Primary Examiner* — Robert T Butcher
(74) *Attorney, Agent, or Firm* — Patterson, Thuente, Pedersen, P.A.

(57) ABSTRACT

A powder coating composition comprising:
(a) a first acrylic powder resin having a hydroxyl value of at least about 180;
(b) a second acrylic powder resin having a hydroxyl value between about 45 and about 80;
(c) a crosslinker reactive with the hydroxyl functional acrylic resins; and
(d) an acicular filler.

4 Claims, No Drawings

1

LOW REFLECTANCE POWDER COATING COMPOSITION

This invention was made with Government support under Contract Number W912HQ-12-C-0013 awarded by the U.S. Army Corps of Engineers, HECSA. The Government has certain rights in this invention.

Very low gloss powder coatings are desirable for a variety of uses including automotive interior parts, wheel rims, bumpers, firearms, and military applications and other articles where low reflectance is desired. A particular requirement of some military applications involves resistance to penetration by chemical warfare agents according to military specifications such as MIL-PRF-32348. For some military and commercial applications it is useful to provide a coating composition which when applied to a substrate and cured will have a 60° gloss less than 1 and an 85° gloss less than 7, for example, 3.5 or less.

This invention therefore relates to a low gloss powder coating composition comprising:
  (a) a first acrylic powder resin having a hydroxyl value of at least about 180;
  (b) a second acrylic powder resin having a hydroxyl value between about 45 and 80, for example, about 60;
  (c) a crosslinker reactive with the hydroxyl functional acrylic resins; and
  (d) an acicular filler, such as wollastonite.

For certain embodiments of this invention it is useful to have the weight ratio of the first acrylic powder resin to the second acrylic powder resin be greater than about 0.5, for example about 1.0.

One aspect of this invention involves the selection of two different hydroxyl functional acrylic powder resins having varying hydroxyl values. The production of acrylic polymers of a given hydroxyl number is well known within the art. The hydroxyl functional acrylic polymers of this invention are obtained in a customary manner, for example, by polymerizing at least one hydroxyl functional monomer, typically a hydroxyl functional (meth)acrylate such as hydroxyethyl or hydroxypropyl (meth)acrylate, along with other copolymerizable unsaturated monomers. Representative copolymerizable monomers include vinyl compounds such as styrene, methylstyrene, vinyl acetate, and the unsaturated alkyl esters of (meth)acrylic acids. Suitable alkyl (meth)acrylate monomers include, for example, methyl (meth)acrylate, ethyl (meth)acrylate, butyl (meth)acrylate, propyl (meth)acrylate, 2-ethyl hexyl (meth)acrylate, cyclohexyl (meth)acrylate, decyl (meth)acrylate, isodecyl (meth)acrylate, benzyl (meth)acrylate, isobornyl (meth)acrylate, neopentyl (meth)acrylate, and 1-adamantyl methacrylate. By selecting the level of hydroxyl functional monomer which is incorporated into the acrylic powder resins, any given hydroxyl value can be selected. The polymers can be formulated to any useful glass transition temperature. For some applications it is useful to have a Tg of at least 35° C., and sometimes at least 40° C. for each of the hydroxy functional acrylic resins. For some applications it is useful to have the resin with the higher hydroxyl number have a Tg of at least 45° C. or higher to provide ever greater resistance to chemical agents.

For this invention, a first hydroxyl functional acrylic powder resin will be produced having a hydroxyl value of at least about 180, and a second hydroxyl functional acrylic polymer resin will be produced having a hydroxyl value between about 45 and about 80. These resins are then combined with a suitable crosslinking agent reactive with hydroxyl groups, such as a blocked isocyanate or uretdione, to provide the powder coating composition. For some embodiments of this invention, the first acrylic powder resin will have a hydroxyl value between about 180 and about 300, and for some embodiments of this invention it is useful for the second acrylic powder resin to have a hydroxyl value between about 45 and 60, for some embodiments about 60. In another useful embodiment, the first acrylic powder resin will have a hydroxyl value that is at least about 150 higher than the hydroxyl value of the second acrylic powder resin, for example, at least about 150 to about 240 higher, further for example, at least about 170 to about 190 higher.

For those applications requiring resistance to chemical agents it is often useful to provide a weight ratio of the first acrylic powder resin to the second acrylic powder resin greater than 0.5, for example, greater than 0.8, further for example about 1.0. Typically, for the combination of the first acrylic powder resin and the second acrylic powder resin, between about 33.3 weight percent and 66.6 weight percent of the total amount of hydroxy functional acrylic resin would be the first acrylic powder resin. For some applications, between about 50 and 66.6 percent by weight of the combined weight of the first and second acrylic resins would be the second acrylic powder resin.

The powder coating composition of the present invention also includes a crosslinker reactive with the hydroxyl functional acrylic resins. In one useful embodiment a crosslinker having isocyanate functionality is used. Isocyanate compounds useful in the compositions of this invention have at least one isocyanate group per molecule. Polyisocyanate crosslinkers may be prepared by modifying simple aliphatic, cycloaliphatic, araliphatic and/or aromatic diisocyanates, being constructed from at least two diisocyanates, and having a uretdione, isocyanurate, allophanate, biuret, iminooxadiazinedione and/or oxadiazinetrione structure. Suitable diisocyanates for preparing such polyisocyanates are any desired diisocyanates of the molecular weight range 140 to 400 g/mol that are obtainable by phosgenation or by phosgene-free processes, as for example by thermal urethane cleavage, and have aliphatically, cycloaliphatically, araliphatically and/or aromatically attached isocyanate groups, such as 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanato decane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4 (3)-isocyanatomethylcyclohexane, bis(isocyanatomethyl)norbornane, 1,3- and 1,4-bis(2-isocyanatoprop-2-yl)benzene (TMXDI), 2,4- and 2,6-diisocyanatotoluene (TDI), 2,4'- and 4,4'-diisocyanatodiphenylmethane (MDI), 1,5-diisocyanatonaphthalene or any desired mixtures of such diisocyanates. Useful polyisocyanates or polyisocyanate mixtures may contain exclusively aliphatically and/or cycloaliphatically attached isocyanate groups.

In one useful embodiment, the isocyanate crosslinker is a blocked isocyanate. Blocked isocyanate are prepared by reacting polyisocyanates with a reagent so that the polyisocyanate is stable at room temperature. Upon exposure to heat, the blocking group will dissociate to regenerate the isocyanate functionality. Suitable blocking groups may be selected from alcohols, caprolactam, phenols, methyl ethyl ketoxime, and active methylene compounds.

The ratio of equivalents of isocyanate to active hydrogen can be widely varied within the practice of this invention. The polyisocyanate will typically be present at a level to provide about 1.0 to about 2.0, for example, about 1.0 to about 1.5, equivalents of isocyanate for each equivalent of active hydrogen from the acrylic powder resins.

Additionally, it has been found that the use of an acicular filler, such as wollastonite, as a flattening pigment is useful in meeting the very low gloss and chemical resistance requirements of these coatings. Typically, the acicular filler, such as wollastonite, would be present at a weight solids percent of at least 10 percent and for some embodiments, at least 15 percent, and for some embodiments at least 25 percent of the total weight solids of the coating. For some applications it is useful to use a level of acicular filler, such as wollastonite, between about 10 and 35 percent by weight of the total weight solids of the final powder coating composition comprising the resins, the crosslinker and pigments.

Additional pigments such as titanium dioxide, metallic pigments, iron oxides, carbon black, organic pigments etc. can also be included. The coatings may also contain extender pigments, including polymeric extender pigments provided they are stable at the processing and cure temperatures of the powder coatings.

Additives such as flow agents, degassing agents, antistatic agents, plasticizers, light stabilizers, light absorbers, catalysts etc. can also be added. In one useful embodiment of the invention, the coating composition is substantially free of UV absorbers and hindered amine light stabilizers.

The powder coatings of this invention can be prepared by typical means well known in the art such as by first melt blending the ingredients of the coating compositions in an extruder at a suitable temperature. The extrudate is then cooled and pulverized.

The application of the powder coatings can be made by any means well known in the art for powder coatings such as by electrostatic spraying or by the use of a fluidized bed to any suitable substrate. If desired, the substrate can optionally be preheated prior to application of the powder coating composition. Once the coating composition has been applied to the substrate, the coating is cured by heating at a temperature and for a length of time sufficient to cause the reactants to form an insoluble polymer network. Typical cure temperatures would normally range from about 100° C. to about 250° C. for a period of about 10 to about 30 minutes. Suitable substitutes include any substrate which is not adversely affected by the cure time and temperature and would typically include metal, glass and plastic substrates. If desired, the substrate can be pretreated and/or coated with one or more suitable primer coats before application of the coatings of this invention.

The following examples illustrate embodiments and practices of advantage to a more complete understanding of the invention. Low reflectance powder coating compositions may be prepared as shown in Table 1. Unless otherwise stated, "parts" means parts-by-weight and "percent" is percent-by-weight, and equivalent weight is on a weight solids basis.

Coating compositions as set forth in Table 1 may be prepared by blending and extruding the listed raw materials. The extrudate may then be cooled and fractured to produce a powder coating which may be applied to a suitable substrate and baked before testing for gloss and other properties.

| RAW MATERIAL | EX. #1 | EX. #2 |
|---|---|---|
| Hydroxy functional acrylic[1] | 150 | 184 |
| Hydroxy functional acrylic[2] | 150 | 184 |
| Blocked isocyanate[3] | 349 | 281 |
| Flow agent[4] | 10 | 10 |
| Benzoin | 5 | 5 |
| Wollastonite | 210 | 210 |
| Surfactant[5] | 4 | 4 |
| Hindered Amine Light Stabilizer[6] | 20 | |
| UV Absorber[7] | 40 | |
| Iron oxide black pigment | 47.5 | 47.5 |
| Carbon black powder | 2.5 | 2.5 |
| Gloss 60/85 | 0.4/2.4 | 0.5/3.2 |

[1]Acrylic powder resin having a hydroxyl number of 60.
[2]Acrylic powder resin having a hydroxyl number of 250.
[3]Vestagon ™ B 1530 e-caprolactam blocked IPDI commercially available from Degussa.
[4]Resiflow P-67 flow agent commercially available from Estron Chemical.
[5]SURFYNOL ® 104S surfactant commercially available from Air Products.
[6]TINUVIN ® 144 HALS commercially available from BASF
[7]TINUVIN ® 928 commercially available from BASF While this invention has been described by a specific number of embodiments, other variations and modifications may be made without departing from the spirit and scope of the invention as set forth in the appended claims.

We claim:

1. A powder coating composition comprising:
    (a) a first hydroxyl functional acrylic powder resin having a hydroxyl value of at least about 180 and having a Tg of at least 35° C.;
    (b) a second hydroxyl functional acrylic powder resin having a hydroxyl value between about 45 and about 80 and having a Tg of at least 35° C.;
    (c) a blocked isocyanate crosslinker reactive with the first hydroxyl functional acrylic powder resin and the second hydroxyl functional acrylic resin; and
    (d) wollastonite;
and wherein the weight ratio of the first acrylic powder resin to the second acrylic powder resin is at least about 0.5, the first acrylic powder resin is present at a level to provide between about 33.3 weight percent and 85.1 weight percent of the total combined weight of the first acrylic powder resin and the second acrylic powder resin, the blocked isocyanate crosslinker is present at a level about 1.0 to about 1.5 equivalents of isocyanate functionality for each equivalent of active hydrogen of the first and second hydroxyl functional acrylic resins, the wollastonite is present at a level of at least 10% to about 25% by weight of the coating composition, and the coating composition when applied to a substrate and cured will have a 60° gloss less than 1 and an 85° gloss 3.5 or less.

2. The powder coating composition of claim 1, wherein the second hydroxyl functional acrylic powder resin has a hydroxyl value of about 60.

3. The powder coating composition of claim 1, wherein the weight ratio of the first acrylic powder resin to the second acrylic powder resin is about 1.0.

4. A powder coating composition comprising:
(a) a first hydroxyl functional acrylic powder resin having a hydroxyl value of at least about 250 and having a Tg of at least 35° C.;
(b) a second hydroxyl functional acrylic powder resin having a hydroxyl value between about 45 and about 80 and having a Tg of at least 35° C.;
(c) a blocked isocyanate crosslinker reactive with the first hydroxyl functional acrylic powder resin and the second hydroxyl functional acrylic powder resin; and
(d) wollastonite;

and wherein the weight ratio of the first acrylic powder resin to the second acrylic powder resin is at least about 0.5, the first acrylic powder resin is present at a level to provide between about 33.3 weight percent and 85.1 weight percent of the total combined weight of the first acrylic powder resin and the second acrylic powder resin, the blocked isocyanate crosslinker is present at a level about 1.0 to about 1.5 equivalents of isocyanate functionality for each equivalent of active hydrogen of the first and second hydroxyl functional acrylic resins, the wollastonite is present at a level of at least 10% to about 25% by weight of the coating composition, and the coating composition when applied to a substrate and cured will have a 60° gloss less than 1 and an 85° gloss 3.5 or less.

* * * * *